(12) United States Patent
Yun et al.

(10) Patent No.: US 9,639,188 B2
(45) Date of Patent: May 2, 2017

(54) TOUCH PANEL AND LIQUID CRYSTAL DISPLAY COMPRISING THE SAME

(75) Inventors: Ji Sun Yun, Seoul (KR); Young Sun You, Seoul (KR); Yong Jin Lee, Seoul (KR); Kyoung Hoon Chai, Seoul (KR)

(73) Assignee: LG INNOTEK CO., LTD., Seoul (KR)

(*) Notice: Subject to any disclaimer, the term of this patent is extended or adjusted under 35 U.S.C. 154(b) by 23 days.

(21) Appl. No.: 14/342,485

(22) PCT Filed: Aug. 31, 2012

(86) PCT No.: PCT/KR2012/007027
§ 371 (c)(1),
(2), (4) Date: Oct. 5, 2015

(87) PCT Pub. No.: WO2013/032302
PCT Pub. Date: Mar. 7, 2013

(65) Prior Publication Data
US 2016/0041636 A1    Feb. 11, 2016

(30) Foreign Application Priority Data
Sep. 1, 2011 (KR) .................. 10-2011-0088540

(51) Int. Cl.
*G06F 3/041* (2006.01)
*G06F 3/044* (2006.01)
(Continued)

(52) U.S. Cl.
CPC .......... *G06F 3/041* (2013.01); *G02F 1/13338* (2013.01); *G06F 3/016* (2013.01); *G06F 3/044* (2013.01); *G06F 2203/04111* (2013.01)

(58) Field of Classification Search
None
See application file for complete search history.

(56) References Cited

U.S. PATENT DOCUMENTS

2005/0208709 A1   9/2005   Imai et al.
2008/0150911 A1   6/2008   Harrison
(Continued)

FOREIGN PATENT DOCUMENTS

CN    201583920 U    9/2010
EP    2337049 A1    6/2011
(Continued)

OTHER PUBLICATIONS

Office Action dated Feb. 3, 2016 in Chinese Application No. 201280054088.4.
(Continued)

*Primary Examiner* — Kenneth B Lee, Jr.
(74) *Attorney, Agent, or Firm* — Saliwanchik, Lloyd & Eisenschenk (57) ABSTRACT

A touch panel according to the embodiment includes a substrate, a recess part on the substrate, an electrode unit aligned on the substrate to detect an input position and an actuator aligned on the recess part to transfer vibration force. A liquid crystal display according to the embodiment includes a liquid crystal panel for displaying images; and a touch panel aligned at a display side of the liquid crystal panel such that information is input thereto from an outside. The touch panel includes an input unit for inputting the information; and a haptic unit for applying vibration. The input unit includes a first substrate; a sensor unit aligned on the first substrate to detect an input position; and a wiring electrically connected to the sensor unit. The haptic unit includes a second substrate on the first substrate; a recess part on one surface of the second substrate; an electrode unit aligned on the second substrate to receive position information; and an actuator aligned on the recess part to transfer vibration force.

20 Claims, 4 Drawing Sheets

(51) Int. Cl.
  *G02F 1/1333* (2006.01)
  *G06F 3/01* (2006.01)

(56) References Cited

U.S. PATENT DOCUMENTS

| | | |
|---|---|---|
| 2008/0259044 A1 | 10/2008 | Utsunomiya et al. |
| 2008/0303782 A1 | 12/2008 | Grant et al. |
| 2009/0002328 A1 | 1/2009 | Ullrich et al. |
| 2010/0231367 A1 | 9/2010 | Cruz-Hernandez et al. |
| 2010/0253485 A1 | 10/2010 | Park et al. |
| 2011/0053653 A1* | 3/2011 | Tho .................... H04M 1/0202 455/566 |
| 2011/0102349 A1 | 5/2011 | Harris |
| 2012/0019457 A1* | 1/2012 | Cho ........................ G06F 3/044 345/173 |
| 2012/0062516 A1 | 3/2012 | Chen et al. |

FOREIGN PATENT DOCUMENTS

| | | |
|---|---|---|
| JP | 2006215738 A | 8/2006 |
| JP | 2010-529555 A | 8/2010 |
| JP | 2010-532043 A | 9/2010 |
| JP | 2011002926 A | 1/2011 |
| KR | 20100043770 A | 4/2010 |
| KR | 20100118055 A | 11/2010 |
| KR | 10-2010-0126277 A | 12/2010 |
| KR | 10-2010-0139044 A | 12/2010 |
| KR | 20110029470 A | 3/2011 |
| WO | WO-2010139171 A1 | 12/2010 |

OTHER PUBLICATIONS

European Search Report in European Application No. 12828030.2, dated May 7, 2015.
International Search Report in International Application No. PCT/KR2012/007027, filed Aug. 31, 2012.
Office Action dated Aug. 17, 2016 in Chinese Application No. 201280054088.4.
Office Action dated Nov. 17, 2016 in Korean Application No. 1020110088540.

* cited by examiner

TOUCH PANEL AND LIQUID CRYSTAL DISPLAY COMPRISING THE SAME

CROSS-REFERENCE TO RELATED APPLICATIONS

This application is the U.S. national stage application of International Patent Application No. PCT/KR2012/007027, filed Aug. 31, 2012, which claims priority to Korean Application No. 10-2011-0088540, filed Sep. 1, 2011, the disclosures of each of which are incorporated herein by reference in their entirety.

TECHNICAL FIELD

The disclosure relates to a touch panel and a liquid crystal display including the same.

BACKGROUND ART

In general, a touch panel is a device to input information into a computer and is used together with various display devices including a cathode ray tube and a liquid crystal display (LCD). When installed in the LCD, the touch panel allows a user to select icons or items displayed on the LCD by touching a predetermined region of the touch panel corresponding to the icons or items.

Recently, as the multimedia technology and the display technology have made rapid progress, the resolution of the LCD of a portable communication device has been improved, so the touch panel is increasingly used in the portable communication device.

The touch panel may be mainly classified into a resistive touch panel and a capacitive touch panel. In the resistive touch panel, glass is shorted with an electrode due to the pressure of an input device so that a touch point is detected. In the capacitive touch panel, the variation in capacitance between electrodes is detected when a finger of the user touches the capacitive touch panel, so that the touch point is detected.

However, users of the portable communication device do not satisfy with the use of a transparent touch window, but demand for interfaces, which can be used more naturally, readily and beneficially.

In this regard, a haptic function is provided in the portable communication device.

The haptic refers to the tactile sense imparted to a person when the person touches an object using a tip of a finger or a stylus pen and includes the tactile feedback, which is felt when a skin touches a surface of the object, and the kinesthetic force feedback, which is felt when the movement of the articulations and muscles is interrupted.

As an example of a device for providing the haptic function, there is provided a device having an actuator installed at a lower portion of the touch panel. If the actuator is driven, the driving force of the actuator is transferred to the touch panel fixedly connected to the actuator, so the user can recognize the driving force of the actuator.

However, an additional space is necessary in order to install the actuator for providing the haptic function in the conventional portable communication device using the touch panel. Since a spacer must be inserted between a touch electrode unit and the LCD to provide the space, the thickness of the conventional portable communication device may be increased, causing a problem in terms of slimness and miniaturization.

In addition, the actuator according to the related art requires a predetermined space and a predetermined size for driving. Thus, if the actuator is mounted together with the touch electrode pat and the LCD, a predetermined mounting space is necessary, so the visibility of the LCD may be degraded.

Therefore, an apparatus capable of mounting an actuator providing a superior touch sense to a touch panel of a potable communication device without an additional mounting space is necessary.

DISCLOSURE OF INVENTION

Technical Problem

An object of the disclosure is to provide a touch panel including an actuator while minimizing an increase of a thickness and improving a touch sense.

Solution to Problem

According to one embodiment of the disclosure, there is provided a touch panel including a substrate, a recess part on the substrate, an electrode unit aligned on the substrate to detect an input position and an actuator aligned on the recess part to transfer vibration force.

A liquid crystal display according to the embodiment includes a liquid crystal panel for displaying images; and a touch panel aligned at a display side of the liquid crystal panel such that information is input thereto from an outside. The touch panel includes an input unit for inputting the information; and a haptic unit for applying vibration. The input unit includes a first substrate; a sensor unit aligned on the first substrate to detect an input position; and a wiring electrically connected to the sensor unit. The haptic unit includes a second substrate on the first substrate; a recess part on one surface of the second substrate; an electrode unit aligned on the second substrate to receive position information; and an actuator aligned on the recess part to transfer vibration force.

Advantageous Effects of Invention

The touch panel according to the embodiments includes an input unit for inputting information and a haptic unit for applying vibration. An actuator included in the haptic unit is disposed in a recess part of a substrate. Since the haptic unit is disposed in the recess part of the substrate, the thickness of the touch panel may not be increased. In addition, the actuator is disposed inside a second substrate, so that the actuator can be protected and prevented from being damaged.

Further, the haptic feedback is possible only at an input part of the touch panel rather than generated by vibrating the body of the touch panel using the actuator.

The actuator may generate vibration and transfer the vibration to the touch panel. That is, the tactile sense may be impressed to the touch panel by the actuator. In addition, since the actuator is provided in an active area, which is the input part of the touch panel, the accuracy and sensitivity of the touch input can be improved.

Further, the actuator is transparent, so the degradation of visibility of the touch panel can be prevented.

Meanwhile, according to an LCD of the embodiments, the haptic unit for generating the haptic is disposed on a liquid crystal panel, so the liquid crystal panel can be prevented from being damaged. Further, the haptic unit is positioned closer to a touch surface of the touch panel, so sensitivity can be more improved and the user's experience can be maximized.

MODE FOR THE INVENTION

In the description of the embodiments, it will be understood that when each layer (film), region, patter or structure is referred to as being "on" or "under" another layer (film), region, patter or structure, it can be "directly" or "indirectly" on the other layer (film), region, patter or structure or one or more intervening layers may also be present. Such a position has been described with reference to the drawings.

The thickness and size of each layer (film), region, patter or structure shown in the drawings may be modified for the purpose of convenience or clarity. In addition, the size of the elements does not utterly reflect an actual size.

Hereinafter, embodiments will be described in detail with reference to accompanying drawings.

First, a touch panel according to the first embodiment will be described in detail with reference to FIGS. 1 to 8.

Figure 1:
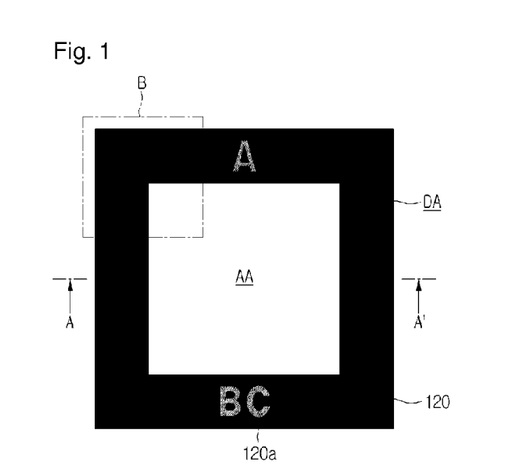
FIG. 1 is a schematic plan view showing a touch panel according to the first embodiment.
Figure 2:
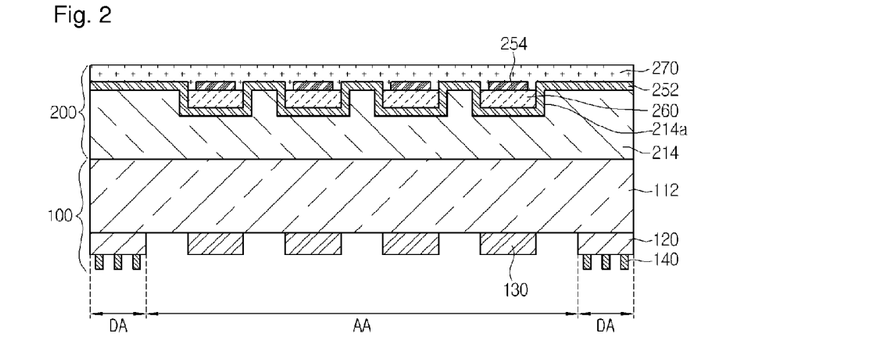
FIG. 2 is a sectional view taken along line A-A' of FIG. 1.
Figure 3:
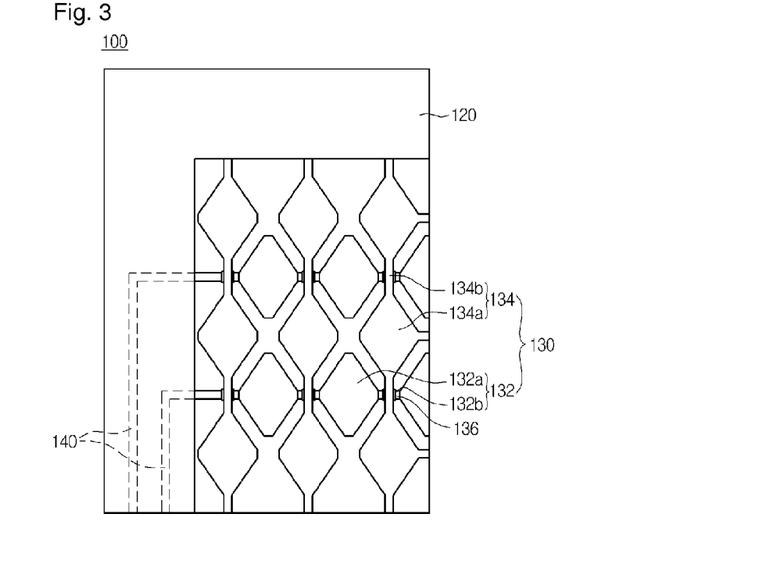
FIG. 3 is an enlarged plan view of a 'B' portion of an input unit included in a touch panel according to the first embodiment shown in FIG. 1.

FIG. 1 is a schematic plan view showing the touch panel according to the first embodiment, FIG. 2 is a sectional view taken along line A-A' of FIG. 1, FIG. 3 is an enlarged plan view of a 'B' portion of an input unit included in the touch panel according to the first embodiment shown in FIG. 1, and FIGS. 4 to 8 are plan views for explaining the manufacturing process of a haptic unit included in the touch panel according to the first embodiment.

Referring to FIGS. 1 to 8, the touch panel according to the first embodiment includes an active area AA for detecting apposition of an input device and a dummy area DA disposed around the active area AA.

A transparent electrode 130 for detecting the input device may be formed on the active area AA. In addition, a wiring 140 connected to the transparent electrode 130 and a printed circuit board connecting the wiring 140 to an external circuit (not shown) may be formed on the dummy area DA. An outer dummy layer 120 may be formed on the dummy area DA and a logo 120a may be formed on the outer dummy layer 120. Hereinafter, the touch panel having the above structure will be described in more detail.

Referring to FIG. 2, the touch panel according to the first embodiment includes an input unit 100 and a haptic unit 200.

The input unit 100 may be divided into several sections in such a manner that a section to which pressure is applied by pressure elements or scanning is detected and position information of the section is sent to a computer.

The input unit 100 may include a first substrate 112, a transparent electrode 130 and a wiring 140. The outer dummy layer 120 and the transparent electrode 130 are formed on first substrate 112. In addition, the wiring 140 is connected to the transparent electrode 130 and a printed circuit board (not shown) is connected to the wiring 140.

The first substrate 112 may be formed by using various materials capable of supporting the outer dummy layer 120, the transparent electrode 130 and the wiring 140 formed on the first substrate 112. For instance, the first substrate 112 may include a glass substrate or a plastic substrate.

The outer dummy layer 120 is formed on the dummy area DA formed at a bottom surface of the first substrate 112. The outer dummy layer 120 may be coated with a material having a predetermined color such that the wiring 140 and the printed circuit board may not be seen from the outside. The outer dummy layer 120 may have a predetermined color suitable for the external appearance of the outer dummy layer 120. For instance, the outer dummy layer 120 may include a black pigment to represent a black color. In addition, the log 120a (see, FIG. 1) can be formed on the outer dummy layer 120 in various schemes. The outer dummy layer 120 may be formed through the deposition, printing, or wet coating scheme.

The transparent electrode 130 is formed on the bottom surface of the first substrate 112. The transparent electrode 130 may have various shapes suitable for detecting the touch of the input device, such as a finger.

For instance, as shown in FIG. 3, the transparent electrode 130 may include a first transparent electrode 132 and a second transparent electrode 134. The first and second transparent electrodes 132 and 134 may include sensor units 132a and 134a for detecting the touch of the input device, such as the finger, and a connection units 132b and 134b for connecting the sensor units 132a and 134a, respectively. The connection unit 132b of the first transparent electrode 132 connects the sensor unit 132a in the first direction (transverse direction in the drawing) and the connection unit 134b of the second transparent electrode 134 connects the sensor unit 134a in the second direction (longitudinal direction in the drawing).

An insulating layer 136 is disposed at the intersection between the connection unit 132b of the first transparent electrode 132 and the connection unit 134b of the second transparent electrode 134 to prevent the electric short between the first and second transparent electrodes 132 and 134. The insulating layer 136 may be formed by using a transparent insulating material capable of insulating the connection units 132b and 134b from each other. For instance, the insulating layer 136 may include metal oxide, such as silicon oxide, polymer or acryl resin.

According to the embodiment, for instance, the sensor units 132a and 134b of the first and second transparent electrodes 132 and 134 are aligned on the same plane as a single layer. Thus, the use of the transparent conductive material can be diminished and the thickness of the touch panel can be reduced.

In this manner, if the input device, such as the finger, touches the touch panel, capacitance difference may occur at the portion touched by the input device, so the portion having the capacitance difference may be determined as the contact position. According to the embodiment, the transparent electrode 130 is applied to the capacitive touch panel, but the embodiment is not limited thereto. For instance, the transparent electrode 130 may be applied to the resistive touch panel.

The transparent electrode 130 may include a transparent conductive material such that electricity may flow without interfering with transmission of light. In this regard, the transparent electrode 130 may include various materials, such as metal oxide including indium tin oxide, indium zinc oxide, copper oxide, tin oxide, zinc oxide or titanium oxide, a carbon nano tube (CNT), or a conductive polymer material.

The transparent electrode 130 may be formed through various thin film deposition technologies, such as physical vapor deposition (PVD) or chemical vapor deposition (CVD). For instance, the transparent electrode 130 may be formed through reactive sputtering, which is one of the physical vapor depositions. At this time, if the transparent electrode 130 is formed by using the indium tin oxide, the content of tin may be equal to or less than 10%. Thus, light transmissivity can be improved. Then, the indium tin oxide is crystallized through the annealing process, so that electric conductivity can be improved. However, the embodiment is not limited to the above, and the transparent electrode 130 may be formed through various methods.

In addition, the transparent electrode 130 may be formed through a printing process. The printing process can be performed by adopting various printing schemes, such as gravure off set, reverse off set, screen printing or gravure printing. In particular, if the transparent electrode 130 is formed through the printing process, a printable paste material can be employed. For instance, the transparent electrode 130 may be formed by using carbon nano tube (CNT), conductive polymer or Ag nano wire ink.

If the transparent electrode 130 is formed through the printing process, the manufacturing process can be simplified and the manufacturing cost can be reduced.

The wiring 140 connected to the transparent electrode 130 and the printed circuit board (not shown) connected to the wiring 140 are provided on the dummy area DA. Since the wiring 140 is formed on the dummy area DA, the wiring 140 may be formed by using a metal having superior electric conductivity. Various types of printed circuit boards may be used as the printed circuit board. For instance, a flexible printed circuit board (FPCB) may be used as the printed circuit board.

Although not shown in the drawing, an anti-scattering film can be formed to cover the transparent electrode 130 and the wiring 140. The anti-scattering film can be formed by using various materials with various structures to prevent particles, which are generated when the touch panel is broken by external impact, from being scattered.

Then, referring again to FIG. 2, the haptic unit 200 may be aligned on the input unit 100. The haptic unit 200 may apply vibration to the touch panel. In detail, when the touch panel is touched, the haptic unit 200 generates the vibration to make the feedback by stimulating the tactile sense to the tip of the finger or the stylus pen.

The haptic unit 200 may include a second substrate 214, electrode units 252 and 254, an actuator 260 and a protective unit 270.

The second substrate 214 may be formed by using various materials capable of supporting the electrode units 252 and 254, the actuator 260 and the protective unit 270 formed on the second substrate 214. For instance, the second substrate 214 may be formed by using glass or a film.

The second substrate 214 may have transmissivity of 90% or above. Thus, the transmissivity of the touch panel may not be degraded.

A recess part 214a may be formed on one surface of the second substrate 214. The recess part 214a may have a concave structure. The actuator 260 for transferring the vibration may be positioned in the recess part 214a. That is, the recess part 214a may receive the actuator 260 therein. In addition, one of the first and second electrode units 252 and 254 may be positioned in the recess part 214a. For instance, referring to FIG. 5, the first electrode unit 252 may be positioned in the recess part 214a.

Figure 4:
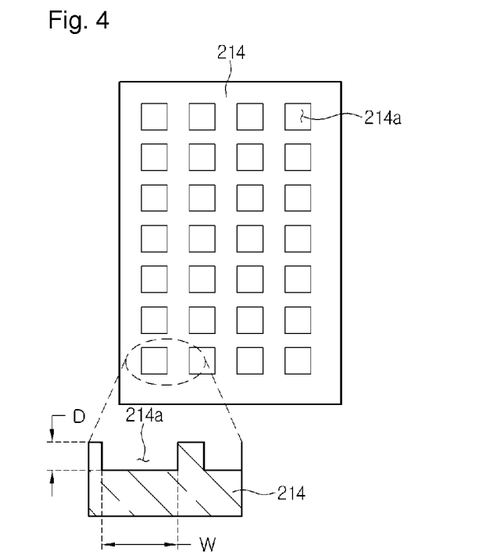
FIGS. 4 to 8 are plan views for explaining the manufacturing process of a haptic unit included in a touch panel according to the first embodiment.

Referring to FIG. 4, when viewed from the front, the recess part 214a may have a rectangular shape, but the embodiment is not limited thereto. For instance, when viewed from the front, the recess part 214a may have various shapes, such as a circular shape, a triangular shape or a hexagonal shape. That is, the shape of the recess part 214a may vary depending on the performance of the actuator 260 positioned in the recess part 214a.

Referring to FIG. 4, a depth D of the recess part 214a may correspond to the sum of the thickness of the first electrode unit 252 and the thickness of the actuator 260. This is because the first electrode unit 252 and the actuator 260 may be positioned in the recess part 214a.

In detail, the recess part 214a may have a depth D in the range of 1 nm to 200 μm. The depth D of the recess part 214a may vary depending on the thickness of the actuator 260 positioned in the recess part 214a.

The recess part 214a may have a width W in the range of 100 μm to 1 mm. A recognition cell in the finger of the person has a very small resolution of about 1 mm. Thus, the recess part 214a must have a small size and many arrays corresponding to the tactile sense.

Thus, a plurality of recess parts 214a are provided while extending in first and second directions.

The electrode units 252 and 254 may include a first electrode unit 252 and a second electrode unit 254. The first electrode unit 252 may extend in the first direction and the second electrode unit 254 may extend in the second direction.

The first electrode unit 252 may be a positive (+) electrode and the second electrode unit 254 may be a negative (−) electrode.

The first and second electrode units 252 and 254 may cause vibration to the actuator 260 at the input position.

That is, the haptic unit 200 receives information about the detected input position from the input unit 100 and generates the vibration through the first and second electrode units 252 and 254 at the input position.

At least one of the first and second electrode units 252 and 254 may have a thickness in the range of 1 nm to 100 nm. The thickness of the first and second electrode units 252 and 254 may vary depending on the thickness of the actuator 260.

At least one of the first and second electrode units 252 and 254 may include at least one selected from the group consisting of indium tin oxide (ITO), carbon nano tube, Ag nano wire, graphene, and conductive polymer.

The actuator 260 may be positioned in the recess part 214a. Since the actuator 260 is positioned in the recess part 214a, the thickness of the touch panel may be prevented from being increased. In addition, the actuator 260 is positioned inside the second substrate 214, so that the actuator 260 is protected and prevented from being damaged.

Further, the haptic feedback is possible only at an input part of the touch panel rather than generated by vibrating the body of the touch panel using the actuator 260.

The actuator 260 may generate vibration and transfer the vibration to the touch panel. That is, the tactile sense may be impressed to the touch panel by the actuator 260. In addition, since the actuator 260 is provided in the active area AA, which is the input part of the touch panel, the accuracy and sensitivity of the touch input can be improved.

Further, the actuator 260 may be transparent. That is, since the actuator 260 is positioned in the active area AA, the actuator 260 may be transparent, so the degradation of visibility of the touch panel can be prevented.

The actuator 260 may include at least one of hydrogel, nafion, electroactive polymer, a piezoelectric actuator, and an MEMS (micro electro mechanical systems) actuator.

The protective unit 270 may be formed on the second substrate 241. In detail, the protective unit 270 may be positioned on the second electrode unit 254. That is, the protective unit 270 may be aligned at the outermost portion of the haptic unit 200.

The protective unit 270 may have the moisture reservation function. In addition, the protective unit 270 may protect the haptic unit 200 from external impact.

The protective unit 270 may have transmissivity of 90% or above. Thus, transmissivity of the touch panel may not be lowered.

The protective unit 270 may have a thickness in the range of 1 nm to 100 nm. The thickness of the protective unit 270 may vary depending on the thickness of the actuator 260.

The protective unit 270 may include a transparent polymer film. In detail, the protective unit 270 may include at least one of polydimethylsiloxane (PDMS), polyimide (PI), polyvinylidene fluoride (PVDF), silicon gel and polyester.

Hereinafter, the manufacturing process for the haptic unit 200 included in the touch panel according to the embodiment will be described with reference to FIGS. 4 to 8.

First, referring to FIG. 4, the second substrate 214 including the recess part 214a is prepared. The recess part 214a may be formed by etching the second substrate 214. For instance, the recess part 214a may be formed through deep reactive-ion etching (DRIE) using plasma including one of SF6 and O2. However, the embodiment is not limited thereto, and the recess part 214a may be formed through laser etching or photo glass etching using a photo mask. After the etching process, a chamfering process is performed and then a reinforcing process is performed. For instance, one of chemical reinforcing, thermal reinforcing and coating reinforcing processes may be performed.

Figure 5:
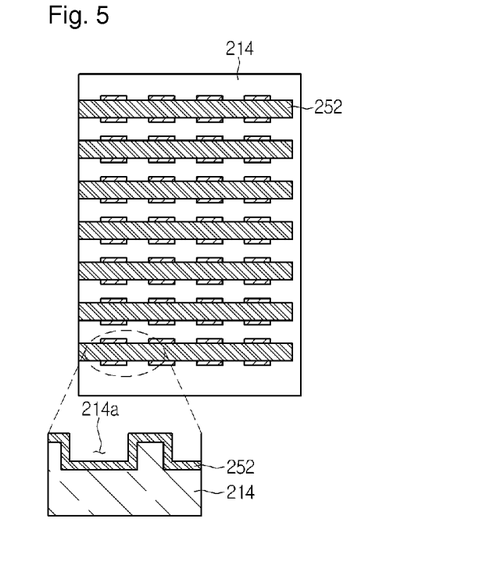

Then, referring to FIG. 5, the first electrode unit 252 may be formed in the first direction of the second substrate 214. The first electrode unit 252 may be formed by patterning a transparent electrode material. The patterning process may include one of photolithography, physical vapor deposition (PVD), chemical vapor deposition (CVD), printing and coating.

Figure 6:
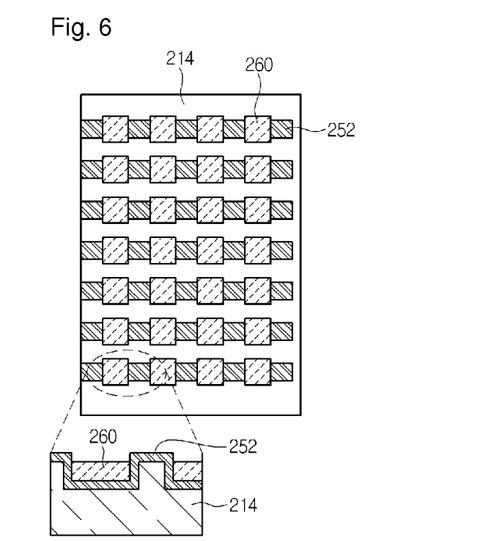

After that, referring to FIG. 6, the actuator 260 may be formed in the recess part 214a. Similar to the first electrode unit 252, the actuator 260 may be formed through the patterning process. For instance, if the actuator 260 includes hydrogel, the hydrogel may be formed by coating monomer on the second substrate 214 and then polymerizing the monomer through the lithography process. Then, the washing process is performed such that unexposed parts are washed and exposed parts remain, so that the actuator 260 can be patterned. That is, the actuator 260 may be formed only in the recess part 214a.

Figure 7:
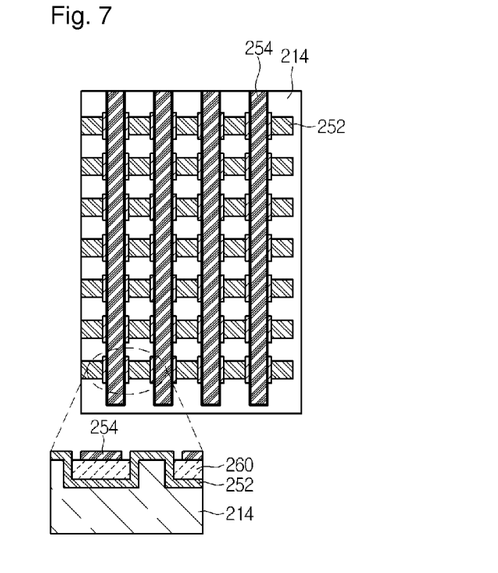

Then, referring to FIG. 7, the second electrode unit 254 may be formed in the second direction of the second substrate 214. Similar to the first electrode unit 252, the second electrode unit 254 may be formed by patterning a transparent electrode material.

Figure 8:
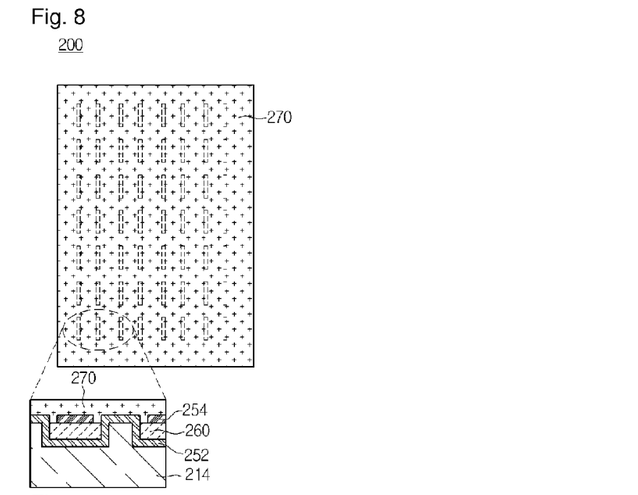

After that, referring to FIG. 8, the protective unit 270 may be formed on the entire surface of the second electrode part 254 to protect the haptic part 200. The protective unit 270 may be formed by coating a thin and transparent film having the moisture reservation function.

Hereinafter, a touch panel according to the second embodiment will be described with reference to FIG. 9. For the purpose of simplicity and clarity, the description about the elements identical to or similar to those of the first embodiment will be omitted.

Figure 9:
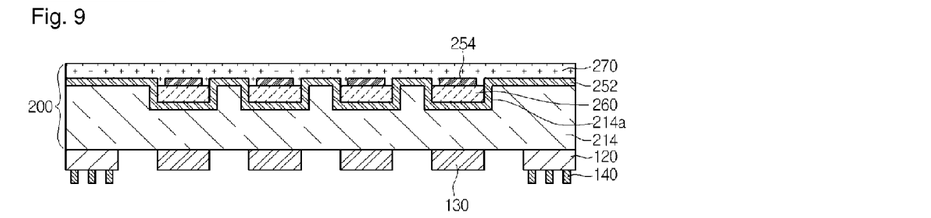
FIG. 9 is a sectional view showing a touch panel according to the second embodiment.

FIG. 9 is a sectional view showing the touch panel according to the second embodiment.

Referring to FIG. 9, the touch panel according to the second embodiment has no the first substrate 112 (see, FIG. 2) provided in the touch panel according to the first embodiment. That is, the input unit and the haptic unit are provided on the same substrate. In detail, the substrate includes a first surface and a second surface opposite to each other, the input unit is provided on the first surface, the haptic unit is provided on the second surface. According to the transparent electrode 130, the wiring 140, the recess part 214a, the actuator 260 and the electrode units 252 and 254 are formed on the second substrate 214, so the thickness of the touch panel may be reduced.

Hereinafter, a touch panel according to the third embodiment will be described with reference to FIG. 10.

Figure 10:
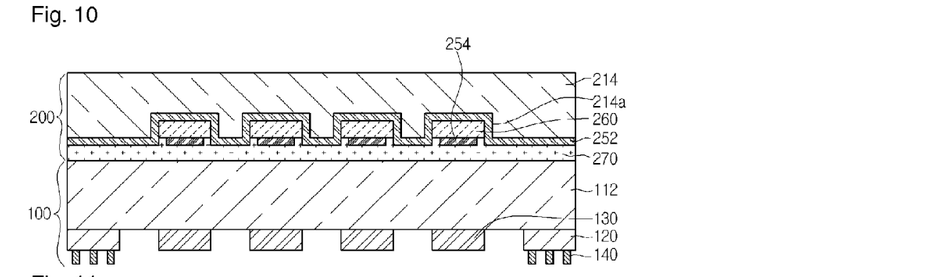
FIG. 10 is a sectional view showing a touch panel according to the third embodiment.

FIG. 10 is a sectional view showing the touch panel according to the third embodiment.

Referring to FIG. 10, the touch panel according to the third embodiment has a structure in which the haptic unit 200 is turned over as compared with the haptic unit 200 of the touch panel according to the first embodiment. In detail, the recess part 214a is formed on the bottom surface of the second substrate 214 so that the actuator 260 positioned in the recess part 214a may be more stably protected from the external impact and contamination.

Figure 11:
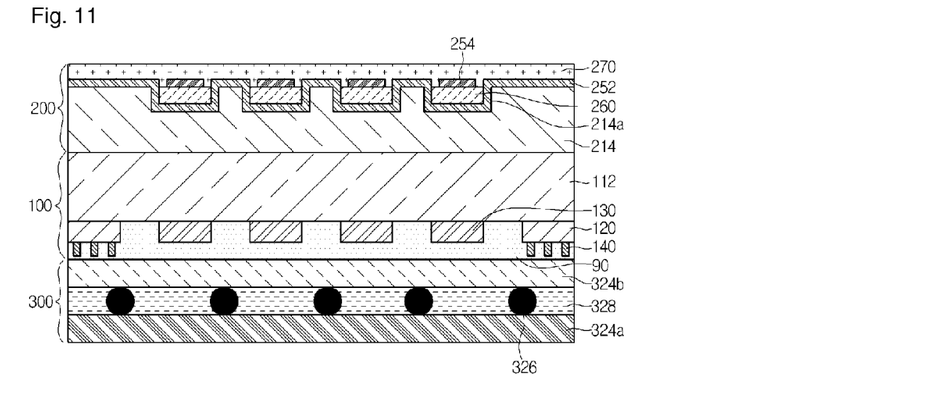
FIG. 11 is a schematic sectional view showing an LCD according to the embodiment.

Hereinafter, a liquid crystal display (LCD) according to the embodiment will be described with reference to FIG. 11. FIG. 11 is a schematic sectional view showing the LCD according to the embodiment.

The LCD according to the present embodiment may include a liquid crystal panel in which the touch panel according to the first embodiment is mounted. The touch panel according to the first embodiment may be laminated on the surface of the liquid crystal panel 300 such that information can be input from the outside through a screen of the liquid crystal panel 300. That is, the touch panel may be bonded to the liquid crystal panel 300 by an adhesive 90. For instance, the adhesive 90 may include an optical transparent adhesive.

The liquid crystal panel 300 is a display unit of the LCD and displays images by adjusting light transmissivity of liquid crystal cells injected between two glass substrates. Each of the liquid crystal cells adjusts the quantity of light passing therethrough in response to a video signal, that is, a corresponding pixel signal.

The liquid crystal panel 300 may include a liquid crystal material 328 injected between a lower glass substrate 324a and an upper glass substrate 324b and a ball spacer 326. In detail, although not shown in the drawing, a gate line, an insulating layer, a pixel electrode and a first alignment layer may be sequentially formed on the lower glass substrate 324a. A black matrix, a color filter, a common electrode, and a second alignment layer may be sequentially formed on the bottom surface of the upper glass substrate 324b. The upper and lower glass substrates 324a and 324b are spaced apart from each other by the ball spacer 326. In detail, the interval between the upper and lower glass substrates 324a and 324b can be uniformly maintained by the ball spacer 326, so that the liquid crystal material 328 has a uniform thickness.

According to the LCD of the present embodiment, the haptic unit 200 generating the haptic is positioned on the liquid crystal panel 300, so the liquid crystal panel 300 can be prevented from being damaged. In addition, the haptic unit 200 is positioned closer to a touch surface of the touch panel, so sensitivity can be more improved and the user's experience can be maximized.

Although FIG. 11 shows the LCD including the liquid crystal panel 300 combined with the touch panel according to the first embodiment, the embodiment is not limited thereto. According to another embodiment, the LCD may include the liquid crystal panel 300 combined with the touch panel according to the second embodiment or third embodiment.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effects such feature, structure, or characteristic in connection with other ones of the embodiments.

Although a preferred embodiment of the disclosure has been described for illustrative purposes, those skilled in the art will appreciate that various modifications, additions and substitutions are possible, without departing from the scope and spirit of the invention as disclosed in the accompanying claims.

The invention claimed is:

1. A touch panel comprising an active area for detecting position of an input and a dummy area disposed around the active area, the touch panel further comprising:
an input unit for inputting information; and
a haptic unit positioned on the input unit to apply vibration,
wherein the input unit comprises:
a first substrate;
a sensor unit for detecting an input position on the first substrate; and
a wiring electrically connected to the sensor unit;
wherein the haptic unit comprises:
a second substrate on the first substrate;
a recess part on one surface of the second substrate;
an electrode unit aligned on the second substrate to receive position information; and
an actuator aligned on the recess part to transfer vibration force;
wherein the second substrate comprises a first thickness and a second thickness in the active area,
wherein the first thickness corresponds to a thickness of the second substrate in the dummy area,
wherein the second thickness corresponds to a thickness excluding a depth of the recess part from the first thickness,
wherein the first thickness is greater than the second thickness,
wherein the recess part has a concave structure,
wherein the actuator is disposed in the concave structure of the active area, and
wherein the actuator is transparent.

2. The touch panel of claim 1, wherein the electrode unit includes a first electrode unit extending in a first direction and a second electrode unit extending in a second direction.

3. The touch panel of claim 2, wherein the first electrode unit, the actuator and the second electrode unit are sequentially aligned on the second substrate.

4. The touch panel of claim 2, wherein the actuator is interposed between the first electrode unit and the second electrode unit.

5. The touch panel of claim 2, wherein a sum of a thickness of the first electrode unit and a thickness of the actuator corresponds to the depth of the recess part.

6. The touch panel of claim 5, wherein the recess part has the depth in a range of 1 nm to 200 μm.

7. The touch panel of claim 2, wherein a plurality of recess parts are aligned while extending in the first and second directions.

8. The touch panel of claim 7, wherein the recess part has a width in a range of 100 μm to 1 mm.

9. The touch panel of claim 2, wherein at least one of the first and second electrode units has a thickness in a range of 1 nm to 100 nm.

10. The touch panel of claim 1, wherein the actuator includes at least one selected from a group consisting of hydrogel, nation, electroactive polymer, a piezoelectric actuator, and a MEMS (micro electro mechanical systems) actuator.

11. The touch panel of claim 2, wherein at least one of the first and second electrode units includes at least one selected from a group consisting of indium tin oxide (ITO), carbon nano tube, Ag nano wire, graphene, and conductive polymer.

12. The touch panel of claim 1, wherein the second substrate includes a glass or a film.

13. The touch panel of claim 2, further comprising a protective unit on the second substrate.

14. The touch panel of claim 13, wherein the protective unit is aligned on the second electrode unit.

15. The touch panel of claim 14, wherein the protective unit includes a polymer film.

16. The touch panel of claim 1, wherein the recess part is formed on a bottom surface of the second substrate.

17. A liquid crystal display comprising:
a liquid crystal panel for displaying images; and
a touch panel aligned at a display side of the liquid crystal panel such that information is input thereto from an outside,
wherein the touch panel comprises an active area for detecting position of an input device and a dummy area disposed around the active area, and the touch panel further comprises:
an input unit for inputting the information; and
a haptic unit for applying vibration;
wherein the input unit comprises:
a first substrate;
a sensor unit for detecting an input position on the first substrate; and
a wiring electrically connected to the sensor unit;
wherein the haptic unit comprises:
a second substrate on the first substrate;
a recess part on one surface of the second substrate;

an electrode unit aligned on the second substrate to receive position information; and
an actuator aligned on the recess part to transfer vibration force;
wherein the second substrate comprises a first thickness and a second thickness in the active area,
wherein the first thickness corresponds to a thickness of the second substrate in the dummy area,
wherein the second thickness corresponds to a thickness excluding a depth of the recess part from the first thickness,
wherein the first thickness is greater than the second thickness,
wherein the recess part has a concave structure,
wherein the actuator is disposed in the concave structure of the active area, and
wherein the actuator is transparent.

18. A touch panel comprising an active area for detecting position of an input device and a dummy area disposed around the active area, the touch panel further comprising:
an input unit for inputting information; and
a haptic unit positioned on the input unit to apply vibration,
wherein the input unit comprises:
a substrate;
a sensor unit for detecting an input position on the substrate; and
a wiring electrically connected to the sensor unit;
wherein the haptic unit comprises:
a recess part on one surface of the substrate;
an electrode unit aligned on the substrate to receive position information; and
an actuator aligned on the recess part to transfer vibration force;
wherein the substrate comprises a first thickness and a second thickness in the active area,
wherein the first thickness corresponds to a thickness of the substrate in the dummy area,
wherein the second thickness corresponds to a thickness excluding a depth of the recess part from the first thickness,
wherein the first thickness is greater than the second thickness,
wherein the recess part has a concave structure,
wherein the actuator is disposed in the concave structure of the active area, and
wherein the actuator is transparent.

19. The touch panel of claim 18, wherein the input unit and the haptic unit are provided on the same substrate.

20. The touch panel of claim 18, wherein the substrate includes a first surface and a second surface opposite to each other, and
wherein the input unit is provided on the first surface and the haptic unit is provided on the second surface.

* * * * *